June 9, 1953    S. D. GALLAGHER ET AL    2,641,124
LOCK FOR FIFTH WHEEL KING PINS
Filed July 11, 1951

INVENTORS
Samuel D. Gallagher
& John Lamversie
BY Christian R. Nielsen
ATTORNEY

Patented June 9, 1953

2,641,124

UNITED STATES PATENT OFFICE 2,641,124

LOCK FOR FIFTH WHEEL KING PINS

Samuel D. Gallagher and John Lamversie,
St. Louis, Mo.

Application July 11, 1951, Serial No. 236,210

2 Claims. (Cl. 70—232)

This invention relates to upper fifth wheel king pin locks.

An object of the invention is the provision of a means for preventing thefts of parked trailer trucks by housing the free king pin in a sleeve which is secured to the pin against unauthorized removal by a lock encased on the sleeve in such a manner that it will be impossible to remove the lock without causing damage to the pin and rendering said pin unfit for use.

Another object of the invention is the provision of a means for rendering the usual king pin of a trailer truck immune to the interconnection with the fifth wheel of an unauthorized tractor, said pin when released from the fifth wheel of a lawful tractor being completely housed by a cylindrical sleeve in such a manner that when the upper end of the sleeve abuts the under face of the upper fifth wheel plate, the sliding U-shaped shackle of a padlock may be inserted through an opening in the side wall of the sleeve to be received by the usual annular slot in the king pin, the padlock and bight portion of the shackle being enclosed within the casings on the sleeve to prevent the application of a tool for cutting the shackle from the lock.

A further object of the invention is the provision of a means for preventing unauthorized application of the fifth wheel of a tractor to the usual king pin of a tractor trailer, said means embracing the annular groove of the king pin, supporting and completely housing a locking means with a portion of said locking means disposed in the groove to prevent removal of the embracing means.

This invention is best understood from a consideration of the following detailed description taken in conjunction with the accompanying drawing forming part of the specification, nevertheless, it is to be understood that the invention is not confined to the specific details, but is susceptible of such changes and modifications as shall define no material departure from the salient features as expressed in the appended claims.

Figure 1:
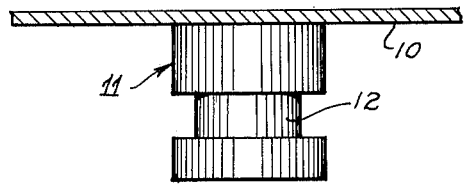
Figure 1 is a side view of the usual upper fifth wheel plate showing the king pin extending downwardly therefrom.
Figure 2:
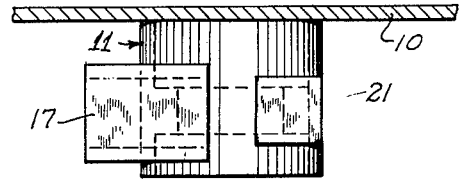
Figure 2 is a side view of our locking device shown applied to the king pin.
Figure 3:
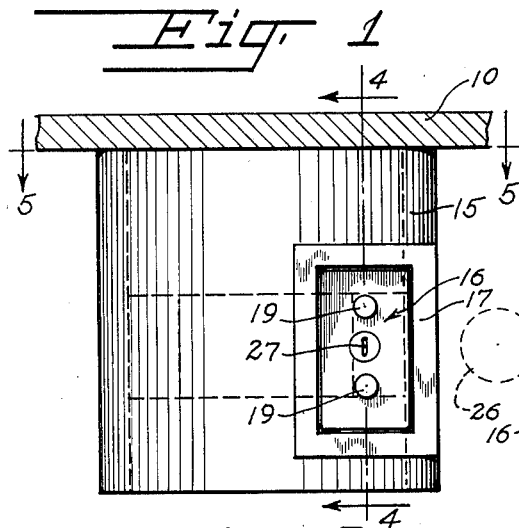
Figure 3 is an enlarged front view in elevation of the applied locking device.

Referring more particularly to the drawings, 10 designates the usual upper fifth wheel plate of a trailer. This plate carries a rigid depending king pin 11 which has a cylindrical form and which has an annular groove 12 adapted to receive the usual fifth wheel of a tractor or other type of propelling means for the trailer.

When a trailer is left in a parking place with the king pin exposed without any deterrent protection, thieves may back a tractor into position relative to the trailer so that the fifth wheel will engage the king pin readily for hauling the trailer away. Thefts of loaded trailers have become quite prevalent due to the ease in automatically interconnecting the fifth wheel of the tractor to the king pin of the trailer.

A lock, as illustrated in the drawings, is provided to prevent the unauthorized automatic interconnection of a tractor with the trailer. The deterrent agent includes two main elements, a circular sleeve 15, and a lock generally indicated by the numeral 16 and cooperatively functioning with the sleeve to prevent unauthorized removal of said sleeve.

The sleeve has a front casing 17 welded thereto and extending tangentially therefrom. The casing has its front end open and is aligned with a portion of the annular groove 12 in the king pin 11. A portion of the sleeve confined by the rear or attached end of the casing forms the rear or inner wall of said casing, said portion of the sleeve is provided with spaced openings 18 adapted to receive legs 19 of a U-shaped shackle 20 of the pad lock 16. The lock is inserted through the open end of the casing to receive the free ends of the legs 19 when the lock is in an operative position, as will be explained presently.

Figure 5:
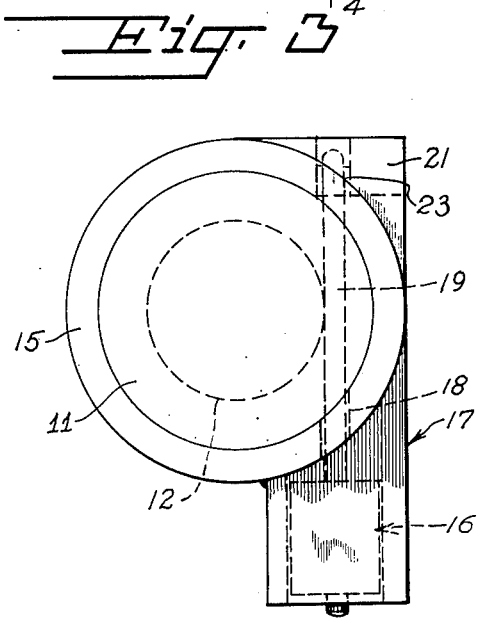
Figure 5 is an enlarged plan view of the locking device and king pin looking in the direction indicated by arrows 5—5 of Figure 4.
Figure 6:
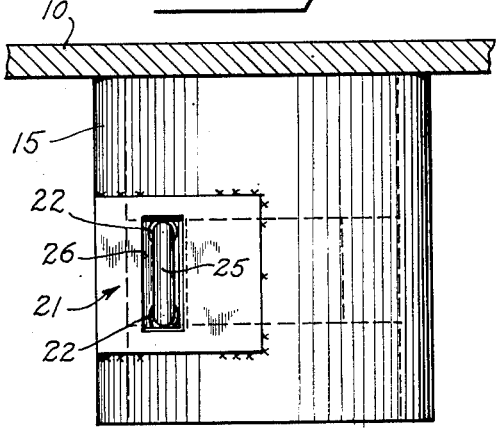
Figure 6 is an enlarged rear view in elevation of our locking device applied to the upper fifth wheel plate and the attached king pin.

A second casing 21 having openings or passages 22 in an interior wall 23 through which the legs of the shackle are inserted, is welded tangentially to the sleeve. The casing 21 is in line with the casing 17 as shown in Figure 5. The passages 22 aline with the same portion of the annular groove 12 with which the casing 17 is alined. The inner edges of parallel side walls 24 conform to the curvature of the sleeve 15. The bight portion 25 of the shackle is seated within the inner end of the passage 26.

Figure 4:
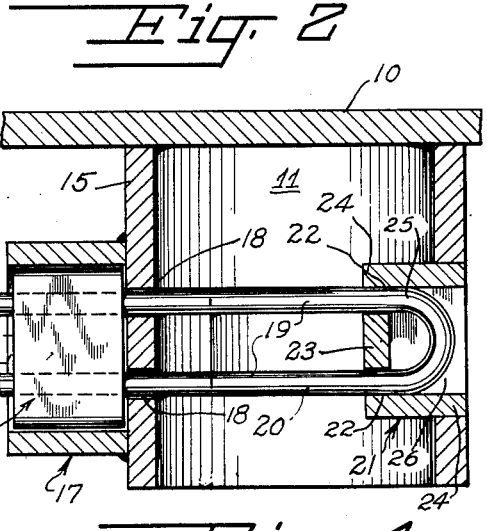
Figure 4 is an enlarged transverse vertical section of the locking device, taken on the line 4—4 of Figure 3.

The application of our locking device or means for preventing unauthorized removal of the trailer truck is as follows—When the fifth wheel of the tractor has been removed from the king pin 11 and the upper fifth wheel plate 10, the trailer is in condition to be removed readily by automatic interconnection with another tractor having the usual type of fifth wheel. In order to prevent such an act by an unauthorized person, the lawful operator places the sleeve 15, free of the lock and its shackle over the king pin 11 until the pin is completely housed therein with the upper end of the sleeve abutting the lower face of the fifth wheel plate 10. Thus it will be seen that the length of the sleeve is such that when said sleeve is in abutting relation with the fifth wheel plate, the casings 17 and 21 will be in longitudinal alinement with a portion of the slot 12 of the king pin. The final step includes the application of the lock 16 and its shackle 20. The legs 19 of the shackle are inserted through the passages 22 of the casing 21 and forced forwardly until they enter the passages 18 in the sleeve 15 and extend through the casing 17. The lock 16 is then inserted into the last mentioned casing while receiving the free ends of the legs of the shackle, as shown in Figure 4. The lock is now fixed in place. A key 26, indicated by dotted lines, is employed for releasing said lock when inserted into the key hole 27.

It will be seen that by this construction, the shackle and lock cannot be removed unless released by a key. The shackle is enclosed entirely by the casing and cannot be reached by a hack saw or other tools to remove the lock as shown in Figure 4. The lock and its cooperating elongated U-shaped shackle is the type of locking device employed generally for preventing the theft of bicycles.

When an attempt is made to steal the loaded trailer truck by backing a tractor so that the usual fifth wheel will be moved into position where the king pin is disposed no connection will be made. Upon inspection by the thief, it will be found that the king pin has been completely housed by the sleeve which has been locked in place by a means which cannot be removed without a great deal of trouble and without special equipment. In view of the fact that it is necessary for the thief, in most instances, to get away quickly, such locking means will act as an ample deterrent. Furthermore, the lock and pin are encased so completely that attempts to remove the sleeve and lock by special equipment will frequently render the pin unfit for use for interconnection with the fifth wheel of a tractor.

The sleeve 15 and the casings 17 and 21 are formed of steel or other hard material, which cannot be cracked, cut off or torn away. The casings may be welded to the sleeve or they may be cast integrally with the sleeve.

We claim:

1. A lock for the king pin of the upper fifth wheel plate of a trailer to prevent automatic interconnection of the fifth wheel of an unauthorized tractor with the usual king pin of the trailer comprising a metal sleeve neatly fitting and completely housing the king pin, said sleeve being provided with oppositely disposed openings disposed in alinement with the usual annular groove in the king pin, a padlock having a U-shaped sliding shackle adapted to be inserted through the oppositely disposed openings with the free ends of the legs of the shackle being received by the lock, and means embracing the openings for housing the lock and the bight portion of the shackle, the legs of the shackle being seated within a portion of the groove to prevent removal of the sleeve.

2. A lock for the king pin of the upper fifth wheel plate of a trailer to prevent automatic interconnection of the fifth wheel of an unauthorized tractor with the usual king pin of the trailer comprising a sleeve mounted on the king pin, oppositely disposed casings on the sleeve being longitudinally alined with the usual annular groove in the pin, a padlock enclosed within one of the casings, a portion of the sleeve embraced by the last mentioned casing being provided with a pair of openings, the outer end of said casing being open for the insertion of the padlock, the other casing having a pair of passages therethrough, said passages extending through that portion of the side wall of the sleeve embraced by the second casing, and a U-shaped shackle received by the passages and the pair of openings while seated in the groove of the king pin, the free ends of the legs of the shackle being received by the lock, the casings preventing cutting of said shackle.

SAMUEL D. GALLAGHER.
JOHN LAMVERSIE.

References Cited in the file of this patent

UNITED STATES PATENTS

| Number | Name | Date |
| --- | --- | --- |
| 1,250,122 | Ali | Dec. 18, 1917 |
| 1,542,073 | Martin | June 16, 1925 |
| 1,640,840 | Koltler | Aug. 30, 1927 |
| 2,554,306 | Mack | May 22, 1951 |

FOREIGN PATENTS

| Number | Country | Date |
| --- | --- | --- |
| 372,170 | Germany | Mar. 27, 1923 |